US012422028B2

(12) United States Patent
Werquin

(10) Patent No.: US 12,422,028 B2
(45) Date of Patent: Sep. 23, 2025

(54) LOCKING/UNLOCKING SYSTEM FOR A LOST-MOTION THRUST REVERSER ACTUATOR, AND ACTUATOR INCLUDING SUCH A SYSTEM

(71) Applicant: SAFRAN ELECTRONICS & DEFENSE, Paris (FR)

(72) Inventor: Mickael Werquin, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 83 days.

(21) Appl. No.: 18/532,456

(22) Filed: Dec. 7, 2023

(65) Prior Publication Data
US 2025/0224023 A1 Jul. 10, 2025

(51) Int. Cl.
*F16H 25/24* (2006.01)
*F02K 1/76* (2006.01)

(52) U.S. Cl.
CPC .......... *F16H 25/2454* (2013.01); *F02K 1/766* (2013.01)

(58) Field of Classification Search
CPC .............................. F16H 25/2454; F02K 1/766
See application file for complete search history.

(56) References Cited

U.S. PATENT DOCUMENTS 5,997,054 A * 12/1999 Baudu ..................... F02K 1/766
   292/201
6,722,485 B1 * 4/2004 Gitnes ................. F16H 25/2021
   192/223.1
9,422,888 B2 * 8/2016 Werquin ................. F16H 25/20
9,458,795 B2 * 10/2016 Werquin ................. F02K 1/766
10,907,712 B2 * 2/2021 Bastide ............... F16H 25/2454
11,873,092 B2 * 1/2024 Rozeboom ............. B64D 45/00

FOREIGN PATENT DOCUMENTS

| FR | 3 003 605 A1 | 9/2014 | |
|----|--------------|--------|----|
| FR | 3 006 379 A1 | 12/2014 | |
| FR | 3 008 741 B1 | 4/2017 | |
| FR | 3 061 530 A1 | 7/2018 | |
| FR | 3079563 A1 * | 10/2019 | ............... F02K 1/09 |

OTHER PUBLICATIONS

French Preliminary Search Report for FR 2212889 dated Jun. 8, 2023.

* cited by examiner

*Primary Examiner* — Jake Cook
(74) *Attorney, Agent, or Firm* — Sughrue Mion, PLLC

(57) ABSTRACT

A locking/unlocking system for a thrust reverser actuator includes a preloading arrangement mounted between a locking part and an input gear of an actuator drive mechanism, the preloading arrangement holding the locking part and the input gear rotationally fixed when a torque between the drive mechanism and the locking part is less than a preloading threshold and decoupling the locking part and the input gear when the torque becomes greater than the preloading torque, a decoupling movement displacing the locking member from a locked position to an unlocked position, the drive movement then being able to be transmitted in order to allow a deployment of the thrust reverser actuator.

10 Claims, 11 Drawing Sheets locked position unlocked position

LOCKING/UNLOCKING SYSTEM FOR A LOST-MOTION THRUST REVERSER ACTUATOR, AND ACTUATOR INCLUDING SUCH A SYSTEM

GENERAL TECHNICAL FIELD AND PRIOR ART

Propulsion assemblies of airplanes generally comprise a thrust reverser system or TR ("Thrust Reverser") allowing reversing thrust during landing phases in order to improve the braking capacity of the airplane. A system of this type comprises a set of movable cowlings or doors actuated by a set of associated actuators allowing temporarily obstructing the air stream and reorienting the flow of secondary air outward and toward the front of the nacelle, thus generating a counter-thrust which is added to the braking of the wheels.

These actuators conventionally integrate locking/unlocking systems which can be controlled to engage or disengage the drive shaft in order to prevent or allow rotation of the drive shaft and the deployment of the actuator. The system also comprises a locking inhibitor allowing holding the locking device in the disengaged position as long as the actuator is not in the retracted configuration.

These locking/unlocking systems generally integrate return springs having considerable stiffness in order to ensure that the device is not disengaged in the event of a strong shock (imbalance, rolling impact, etc.). The system must also operate despite considerable dynamic loads which can occur in the event of the loss of a blade of the airplane engine ("Fan Blade Out").

That is the reason for which these systems usually include an electromagnet capable of generating a large unlocking force, intended to overcome the force exerted by the return springs. One example of a locking/unlocking system of this type is for example described in patent application FR3003605.

The invention relates more particularly to the field of lost-motion actuators in which a specially designed mechanism first allows unlocking the jack then, only after unlocking, executing the extension of the movable rod of the jack properly so called. During the closing of the thrust reverser mechanism connected to the jack, the rod of the jack retracts into the body of the jack. At a certain point, the locking mechanism again enters into action during the last rotations of the input shaft of the jack.

An actuator of this type is contemplated for example in application FR3008741.

General Presentation of the Invention

In the systems of the prior art, the electromagnet, as well as control and power supply (additional electronic components, connection hardware, etc.) generate a large bulk and weight for current locking/unlocking devices. The result is also a consequent cost.

A general goal of the invention is to propose a solution which overcomes the disadvantages of locking/unlocking systems.

According to one aspect in particular, the invention proposes a locking/unlocking system of a thrust reverser actuator, said actuator comprising a first element and a second element mounted movably in translation and in rotation relative to the first element, so that rotation of the first element relative to the second element causes a translation of the second element relative to the first element, said system including:

on the one hand, at least one locking part rotationally fixed to the first element, on the other hand, a locking member movable between a locked position in which said member prevents the rotation of the locking part and of the first element, and an unlocked position in which the part allows the rotation of the locking part and of the first element, characterized in that it includes a preloading arrangement, said arrangement holding the locking part and an input gear that is rotationally fixed when the torque between the drive mechanism and the locking part (36) is less than a preloading threshold of the preloading arrangement and decoupling the locking part (36) and said input gear when said torque becomes greater than said preloading threshold, the arrangement including means for displacing the locking member adapted so that the decoupling movement displaces the locking member from its locked position to its unlocked position, the driving movement then being transmitted to the first element by said arrangement in order to allow the deployment of the actuator.

With this solution, the electrical opening is replaced by a mechanical opening, which allows dispensing with the electromagnet and its electrical controls.

The result is a reduction in cost, in bulk and in weight.

It will be noted in particular that in the locking systems of the prior art, when the deployment command is carried out, the control occurs sequentially: the lock is opened electrically, then a torque is supplied to the input of the actuator in order to deploy it.

With the proposed solution, when the deployment demand is carried out, there is no sequential control, the torque is supplied right away at the input of the actuator. The mechanism allows recovering this torque in order to open the lock; when the lock is open, the torque takes another path and allows the deployment of the actuator.

It will be noted in particular that the embodiments proposed allow unlocking despite large external loads (unlocking under load) and has a high efficiency which allows it to operate even in the event of considerable degradation of the contacts and of the friction coefficients resulting from it.

Thus the system is robust over time.

Thus, according to different aspects of the invention, the system is completed by the following feature(s) taken together or according to any of their technically possible combinations:

the means of displacing the locking member include a cam carried by said member, said cam cooperating with a complementary means of the preloading arrangement, said complementary means being adapted to tilt said cam and displace the locking member during a decoupling movement;

a complementary means which cooperates with the cam is a rotary roller mounted on a spindle parallel to the axis of rotation of the locking part, said spindle being rotationally fixed to the input gear;

the preloading arrangement includes at least one spring;

the preloading arrangement includes at least one flange rotationally fixed to the input gear, the rotary roller being mounted on a spindle which extends between said flange and said input gear;

the preloading arrangement includes several rotary rollers mounted between said flange and the input gear, while being distributed over the periphery of said part;

the system includes an eccentric geared cam, mounted on a spindle fixed to the locking part, the gearing of said cam cooperating with gearing carried by a first flange rotationally fixed to the input gear, said first flange and said cam being located in the same plane, the decoupling of said input gear and of the locking part causing the rotation of the cam, the cam cooperating with a surface of the locking member and displacing it under the influence of its rotation;

the spindle of the eccentric cam is mounted between the locking part and a second flange fixed to it;

the system includes a tappet driven in displacement by the decoupling movement;

the tappet is mounted in a housing of the locking part, said tappet cooperating with an internally toothed gear, said gear being driven in rotation by at least one pinion gear meshing on the one hand with the interior teeth of said gear and on the other hand with teeth rotationally fixed to the input gear, the spindles of said pinions being mounted on the locking part or a part fixed to it, the decoupling of said gear and of the locking part causing the translation of the tappet cooperating with a surface of the locking member and displacing it under the influence of its rotation.

The invention also relates to an actuating device for a thrust reverser including at least one actuator comprising a first element and a second element, mounted movably in rotation and translation relative to the first element, so that rotation of the first element relative to the second element causes a translation of the second element relative to the first element, characterized in that it includes at least one proposed locking/unlocking system.

BRIEF DESCRIPTION OF THE DRAWINGS

Other features and advantages of the invention will yet be revealed by the description that follows, which is purely illustrative and not limiting, and must be read with reference to the appended figures in which.

DESCRIPTION OF ONE OR MORE IMPLEMENTATION MODES AND EMBODIMENTS

Figure 1:
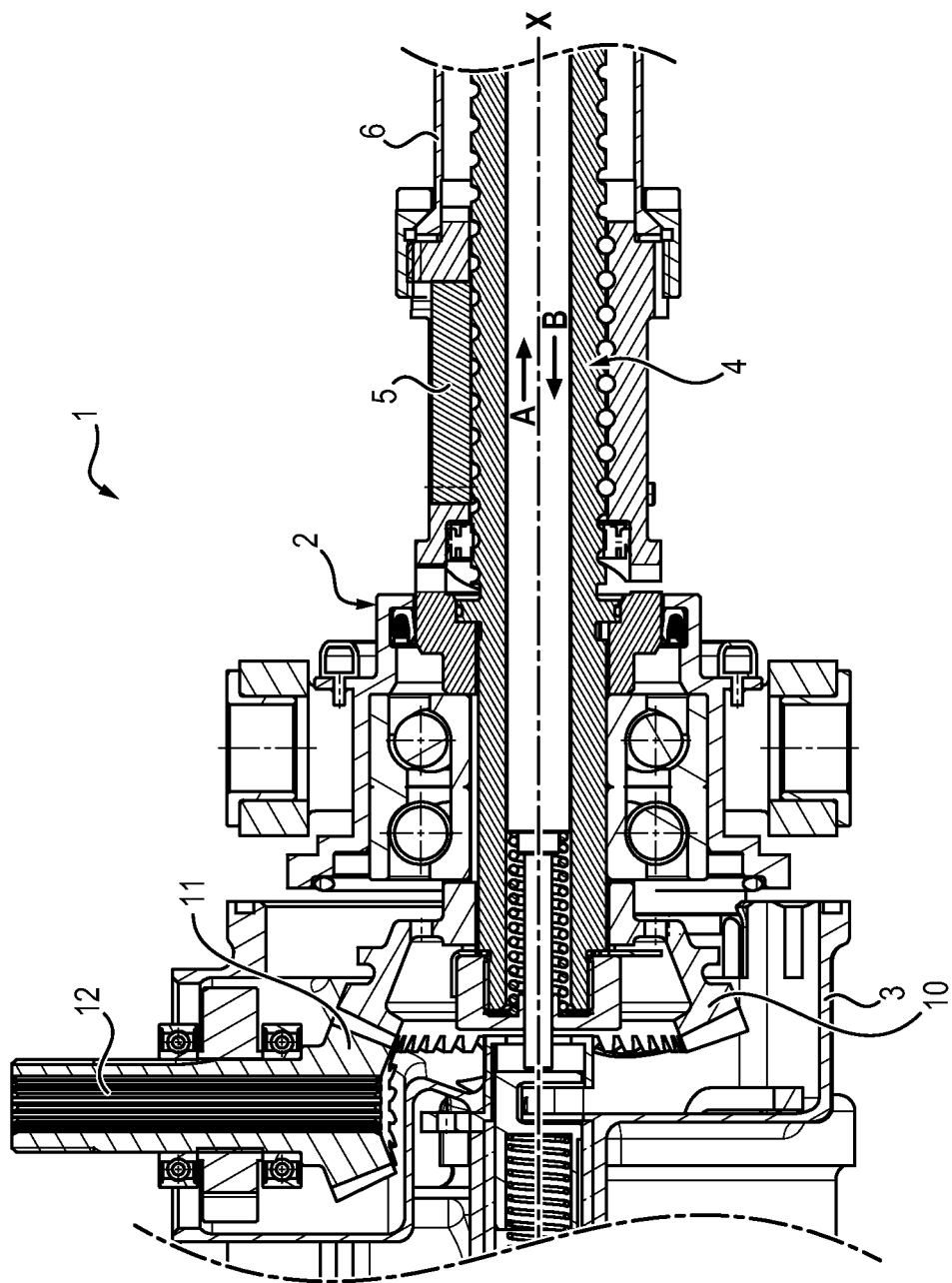
FIG. 1 is a partial representation in section view of an actuating device.
Figure 2A:
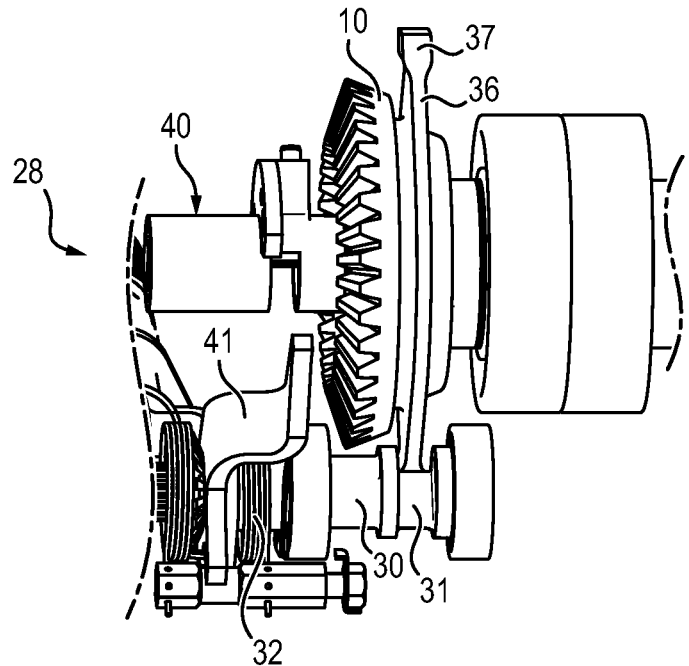
FIG. 2a and FIG. 2b are partial views in perspective of the actuating device, when the locking system is in the locked position (FIG. 2a) and when said system is in the unlocked position (FIG. 2b)
Figure 2B:
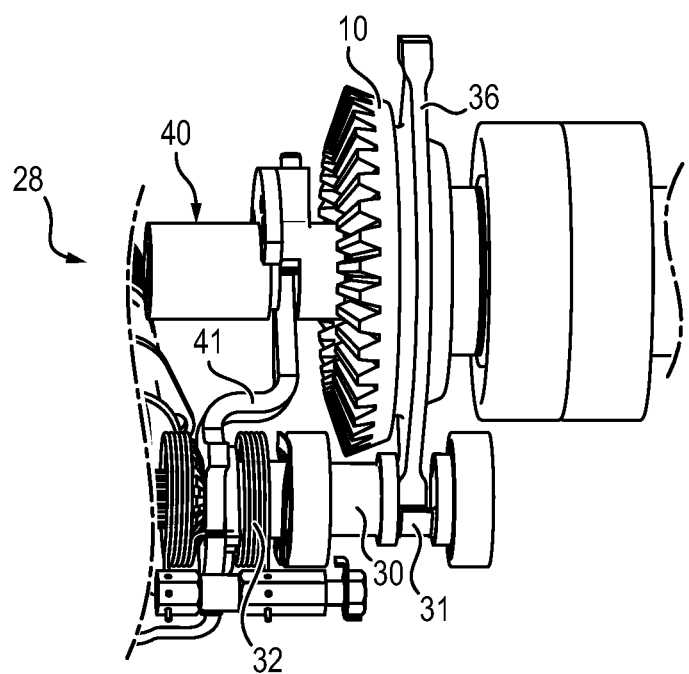

The actuating device illustrated in FIG. 1, as well as in FIGS. 2a and 2b, includes a general structure of that type of that of the device described in application FR 3.003.605, which can advantageously be referred to and the teaching of which is integrated here by reference. This device includes in particular an actuator 2, a locking system 28 (FIGS. 2a, 2b) and a locking inhibitor 40 (FIGS. 2a, 2b). The electrical opening provided by the electromagnet is however replaced in it by a mechanical opening, as will be revealed in the description that follows.

The actuator 2 comprises a casing 3, a screw 4 extending from the casing 3, a nut 5 and an actuator tube 6. The screw 4 is mounted in rotation relative to the casing 3 of the device around an axis of rotation X corresponding to the longitudinal axis of the body of said screw 4 and also corresponding to an axis of deployment of the actuator 2.

When the motor of the actuation system is activated, a torque is introduced into the shaft 12 and the rotation of the screw 4 around the axis X concomitantly drives a translation of the nut 5 parallel to the axis X between a first extreme position (corresponding to a retracted configuration of the actuator) in which the movable component of the thrust reverser is retracted, and a second extreme position (corresponding to a deployed configuration of the actuator) in which the movable component of the thrust reverser is deployed, thus allowing the flow of air circulating in the air stream of the fan to be deflected toward the front of the nacelle.

The driving of the screw 4 in rotation is provided by a conical gear 10 (driving part). Said gear 10 cooperates with a return pinion gear 11 which terminates a drive shaft 12. The shaft 12 is itself driven by a remote motor (not shown).

The locking device 28 is housed inside the casing 3 of the actuator 2. It has the function of blocking the screw 4 in rotation when the actuator 2 is in the retracted configuration, and thus avoiding untimely deployment of the actuator 2, particularly during the flight phase.

The locking device 28 comprises a locking shaft 30 mounted between bearings allowing its rotation around an axis X' parallel to the axis X and having a locking portion 31. The portion 31 is a lock having a half-moon cross section capable of being driven in rotation between, on the one hand, a locked position, and, on the other hand, an unlocked position.

To this end, said locking portion 31 cooperates with a locking part 36 (wolf-tooth ring for example) rotationally fixed to the gear 10. In the locked position, the portion 31 blocks the rotation of the screw 4 of the actuator 2. More precisely, the half-moon cross section of the locking part 31 engages with a wolf tooth 37 of the locking ring 36 to prevent the rotation of the screw 4 in a first direction corresponding to the direction of rotation of the screw 4 during the deployment of the actuator 2.

In the unlocked position, the half-moon cross section of the locking portion 31 is rotated and is disengaged from the wolf tooth 37. The portion 31 allows the rotation of the screw 4.

A return member 32 such as a torsion spring is provided for biasing the locking portion 31 toward the locked position.

The locking inhibitor device 40 comprises a latch 41 which extends in a substantially radial direction relative to the axis X' and which is fixedly mounted to the locking shaft 30.

A mechanism blocks the latch 41, and consequently the shaft 30 so as to hold the locking portion 31 in the unlocked position as long as the actuator 2 is not totally retracted.

This avoids untimely locking of the actuator 2 which could block the actuator 2 during its deployment, particularly during the landing phase.

Figure 3:
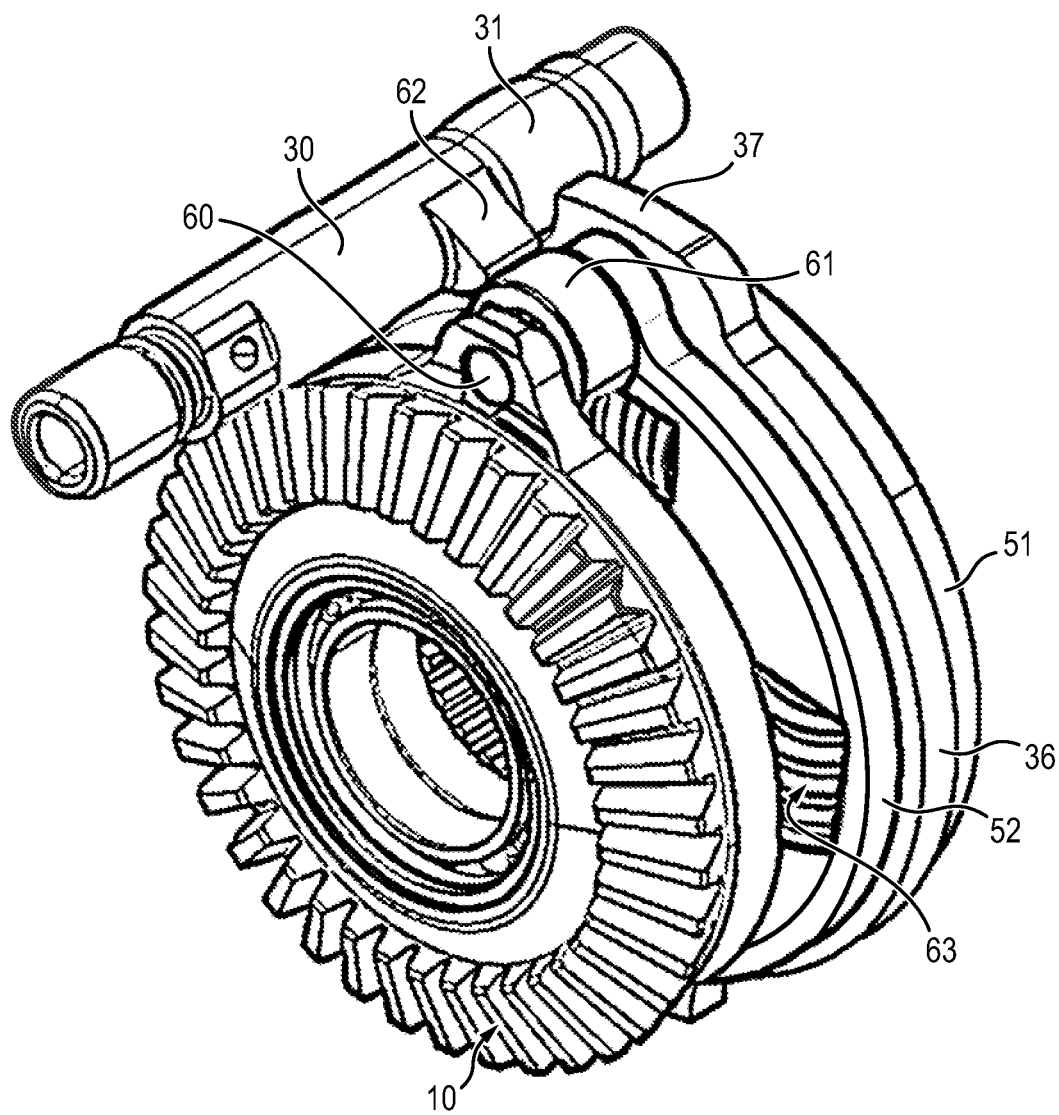
FIG. 3 and FIG. 4 are perspective and exploded perspective views of a locking system conforming to a possible embodiment of the invention.
Figure 4:
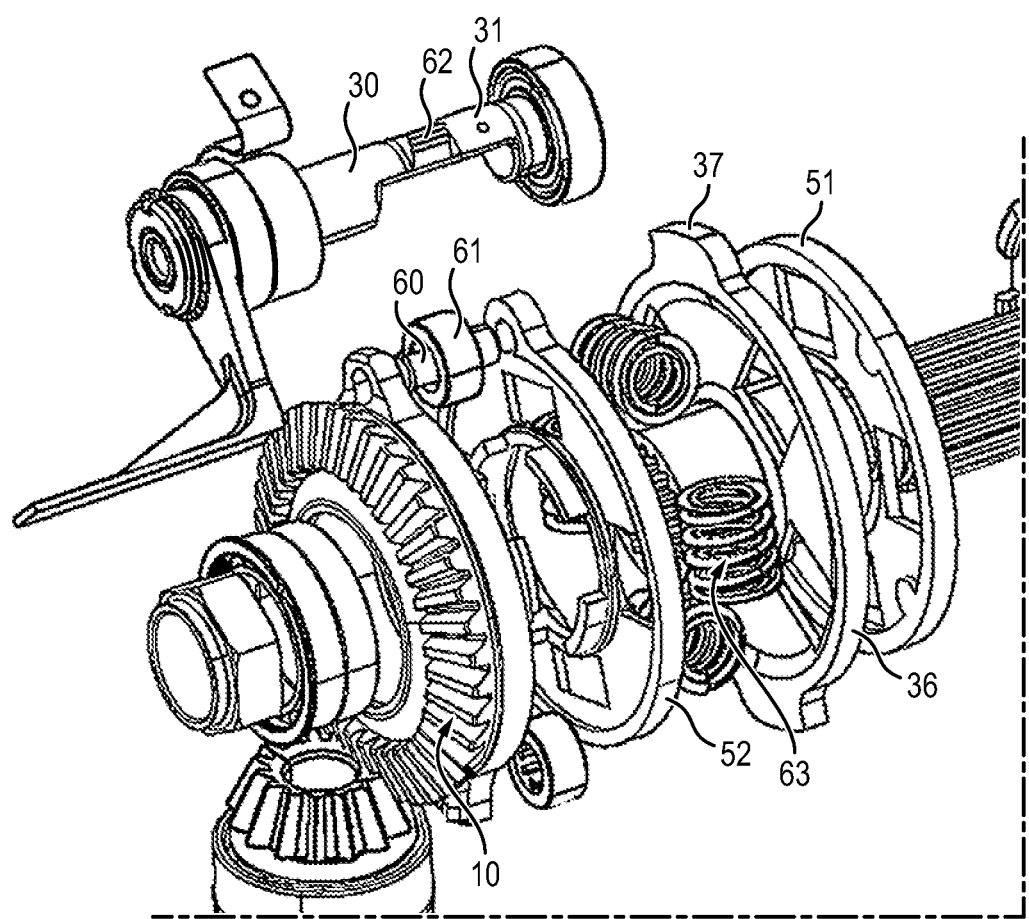

In a possible embodiment illustrated in FIGS. 3 and 4, the wolf-tooth 37 locking ring 36 is mounted interleaved between two flanges 51 and 52 of a preloading system 50 using springs.

The locking ring 36 is rotationally fixed to the screw 4.

The flanges 51 and 52 are fixed to the gear 10.

The flanges 51, 52 and the gear 10 have a degree of freedom in rotation relative to the screw 4 and therefore of the locking ring, around the axis X.

The flange 52 is connected to the gear 10 by two spindles 60 parallel to the axis X and extending between the gear 10 and the flange 52. These two axes 60 each carry a rotary roller 61. The rollers 61 are able to be supported against a cam 62 which protrudes relative to the portion 31 with a half-moon cross section.

Also as a variant, it is also possible to have only a single spindle/roller pair.

The spindles 60 and the rollers 61 can also be more than two in number. They are distributed over the periphery of the rotor 10 to allow the cooperation of the rollers and of the cam 62.

Several springs 63 provide for the angular holding of the flanges 51 and 52 relative to the locking ring 36 as long as a threshold torque value is not attained between, on the one hand, the gear 10 and, on the other hand, the locking ring 36.

Typically, the preload is provided by four helical springs 63 interlocked between the flanges 51 and 52. These springs 63 are distributed with axes extending in two directions, perpendicular and parallel to the planes of the flanges 51 and 52. Together, they provide for example a preloading torque comprised between 10 N·m and 20 N·m, particularly 16 N·m.

Together the flanges 51 and 52, as well as the springs 63, constitute a preloading arrangement.

The operation of this system is the following.

The motor of the actuating system transmits to the gear 10, via the shaft 12 and the pinion gear 11, an actuating torque.

Figure 5A:
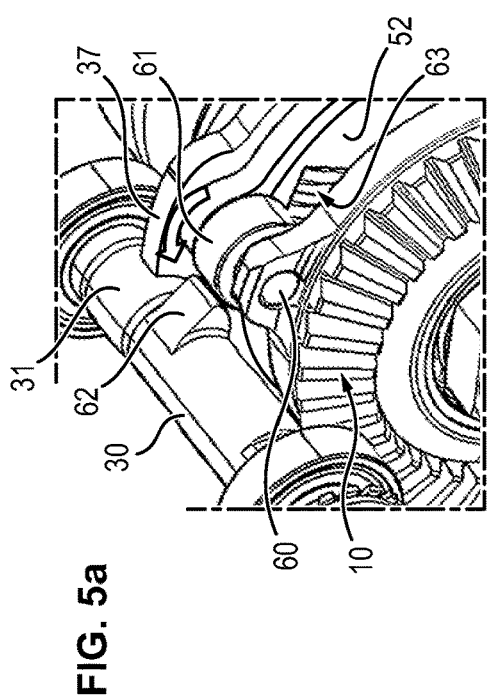
FIG. 5a, FIG. 5b, FIG. 5c and FIG. 5d illustrate different phases of unlocking the system of FIGS. 3 and 4.

Initially, the gear 10 begins to rotate the assembly, which is then blocked by the abutment of the wolf-tooth locking ring 36 against the locking portion 31 of the shaft 30 which remains in the locked position (FIG. 5a).

If the force is continued, the torque on the gear 10 increases until it exceeds the preloading torque of the springs.

Figure 5D:
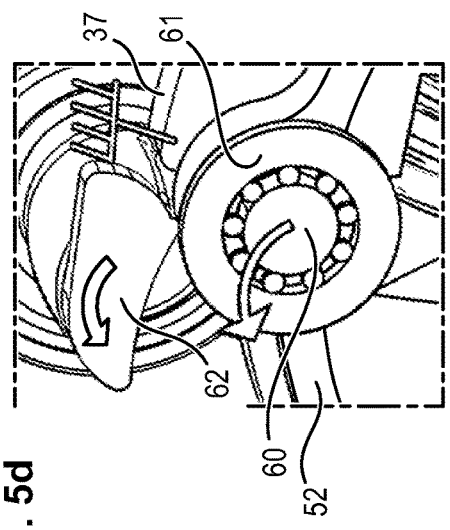
Figure 5C:
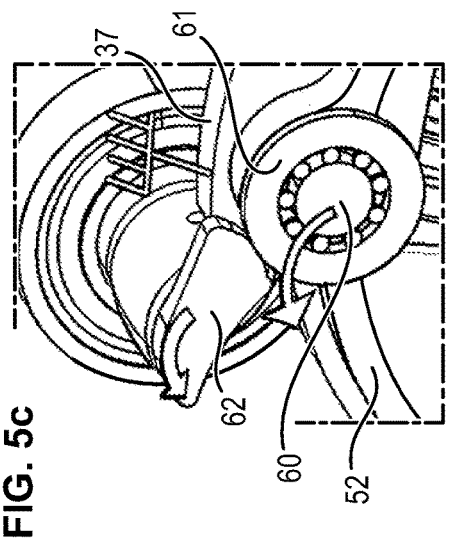
Figure 5B:
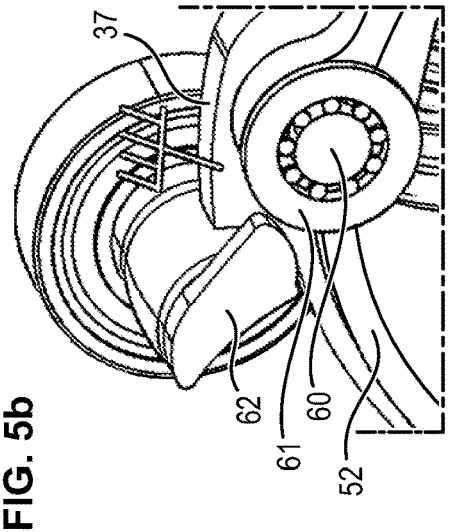

The gear 10, the flanges 51 and 52 and the rollers 61 rotate, while the locking ring 36 and the screw 4 are blocked by the abutment of the wolf tooth 37 against the portion 31 (FIG. 5b).

The roller 61 is then supported against the cam 62. It drives said cam 60 in its movement. The lock that the locking portion 31 constitutes is then tilted into its unlocked position where the passage of the wolf tooth 37 is freed (FIG. 5c).

The movement continues by driving the locking ring 36 and the screw 4. The actuator can then deploy (FIG. 5d).

When the actuator begins its deployment, the inhibition system is activated and holds the lock in the unlocked position.

Figure 6:
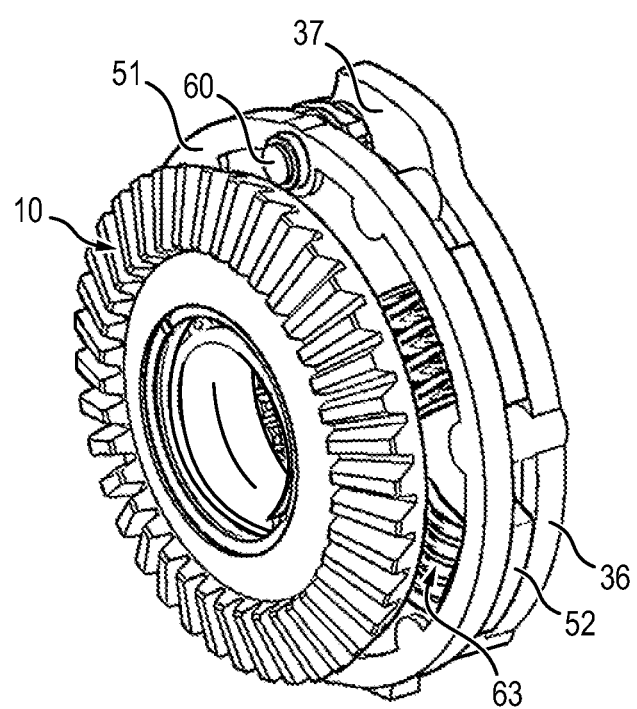
FIG. 6 and FIG. 7 are perspective and exploded perspective views of a locking system conforming to a second possible embodiment of the invention.
Figure 7:
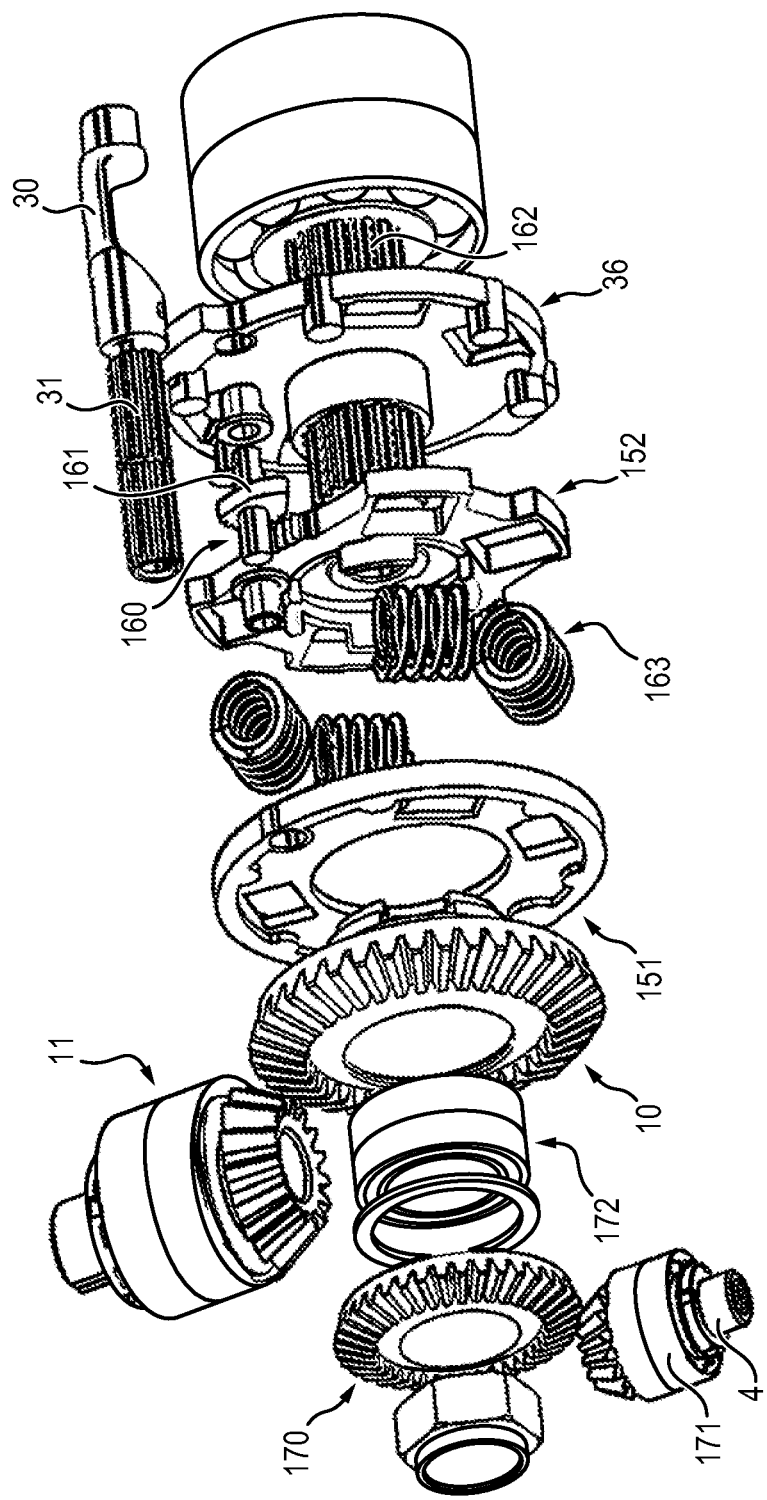

In the embodiment illustrated in FIGS. 6 and 7, a preloading system 150 is interleaved between the gear 10 and the wolf-tooth locking ring 36. This system includes two flanges 151 and 152, between which are mounted load springs 163. The flange 151 is mounted rotationally fixed to the locking ring 36, while the flange 152 is rotationally fixed to the gear 10.

Together the flanges 151 and 152, as well as the springs 163, constitute a preloading arrangement.

A geared cam 161 is mounted on a shaft 160 with an eccentric rotation, which extends between the locking ring and the flange 151. Said cam 161 is in the same plane as the flange 152. The gearing of said cam 161 cooperates with a complementary gearing which the flange 152 has in line with said cam 161.

Said cam 161 is intended to cooperate with the half-moon cross section of the locking portion 31 to cause the shaft 30 to rotate.

Figure 8:
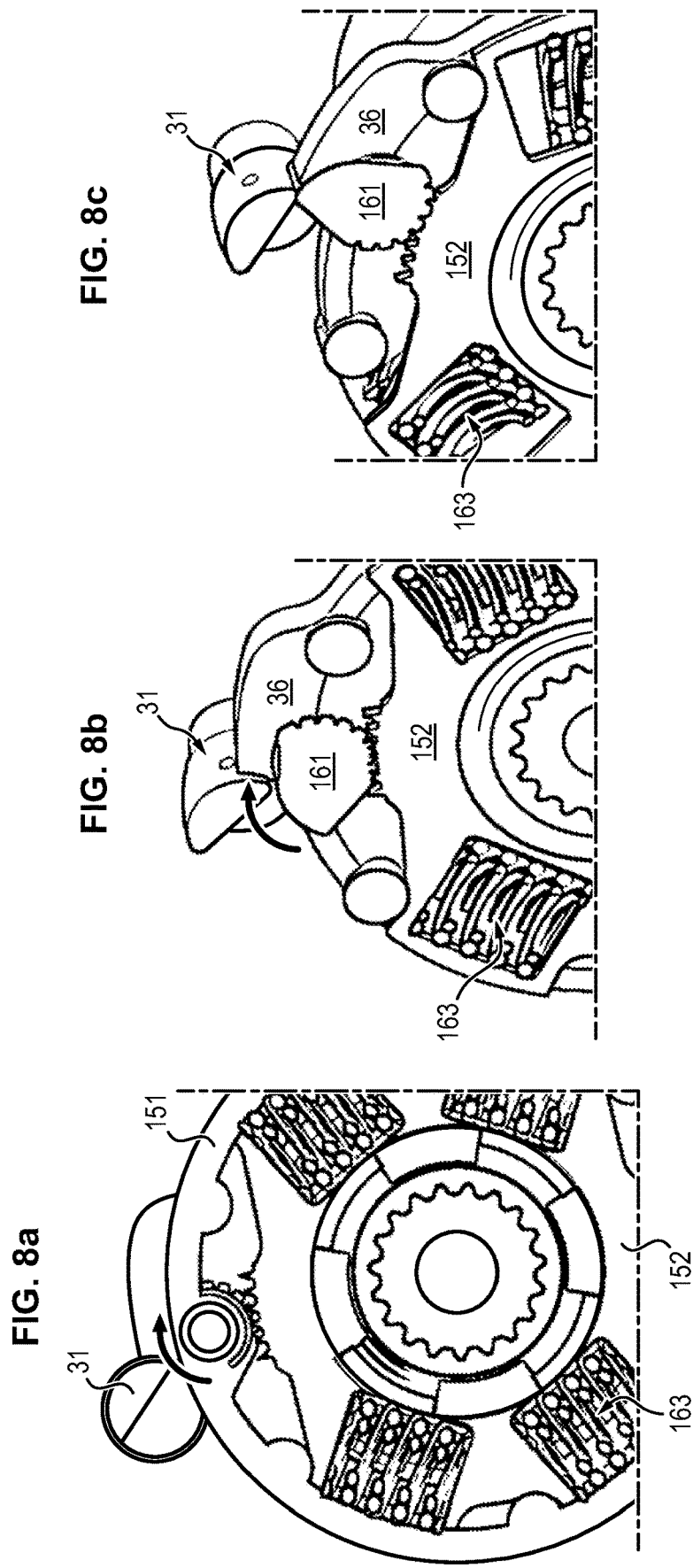
FIG. 8a, FIG. 8b and FIG. 8c illustrate different phases of unlocking the system of FIGS. 6 and 7.

Unlocking is illustrated in FIGS. 8a to 8c.

Upon initiation of driving the gear 10 by the pinion gear 11 and the drive shaft 12, the wolf tooth 37 of the locking ring 36 comes into abutment against the half-moon cross section of the portion 31 (FIG. 8a).

This position is held until the preloading torque threshold of the springs 163 is attained. Beyond this, the two flanges 151 and 152 cease to be fixed to one another, which has the effect of causing the eccentric cam 161 to rotate on the gearing of the flange 152. In fact, the flange 152 rotates with the drive gear 10, while the flange 151 is blocked in rotation by the locking ring 36 (FIG. 8b).

The rotation of the cam 161 on its axis then causes the tilting of the portion 31 with the half-moon cross section, with which said cam 161 cooperates (FIG. 8c).

Thus the shaft 30 is tilted, which frees the wolf tooth 37 and the ring 36. The screw 4 can then be driven.

Figure 9:
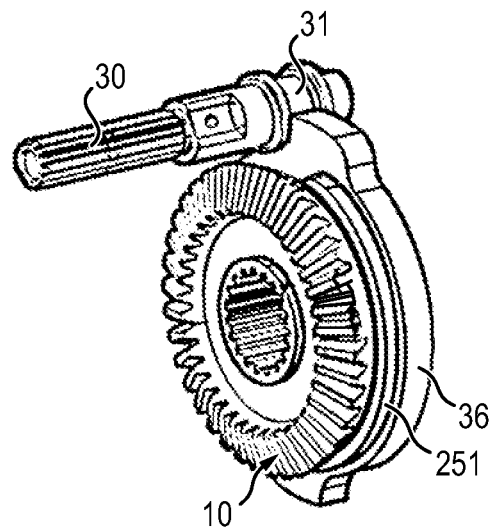
FIG. 9 and FIG. 10 are perspective and exploded perspective views of a locking system conforming to another possible embodiment of the invention.
Figure 10:
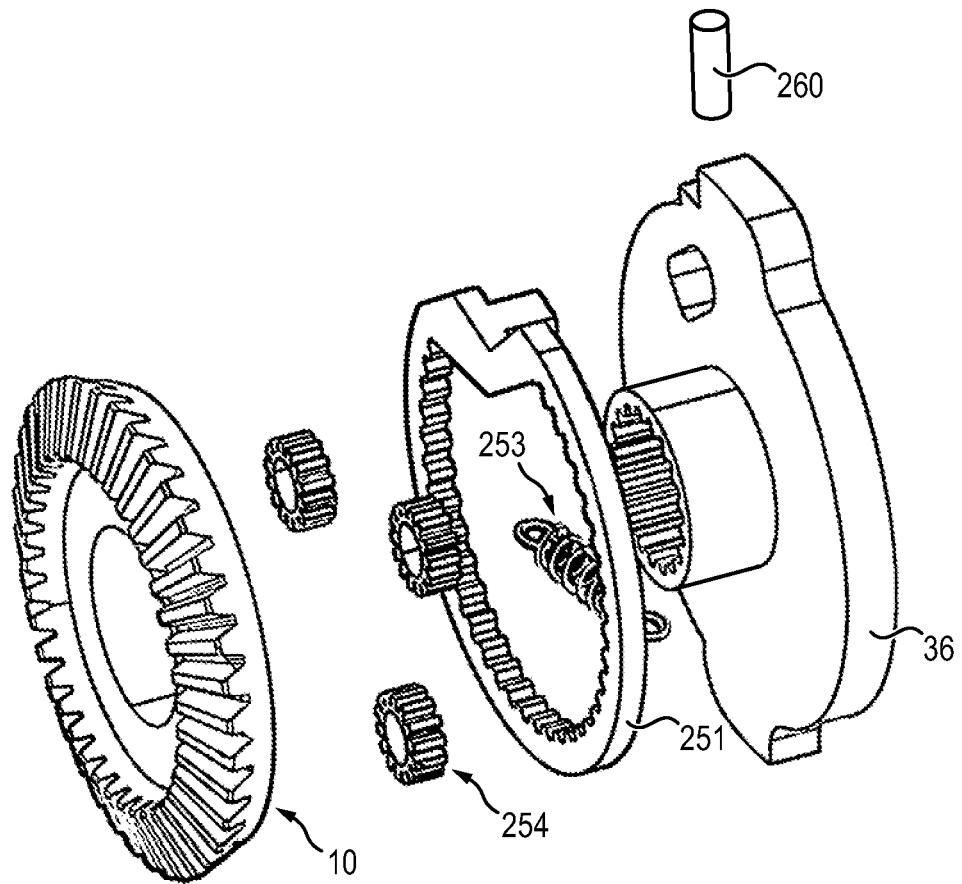

Another solution is also illustrated in FIGS. 9 and 10. In this embodiment, the preloading springs 263 are mounted between, on the one hand, an internally toothed ring 251 and, on the other hand, the locking ring 36.

Several pinion gears 254 are mounted on spindles carried by the locking ring 36. These pinion gears 254 mesh, on the one hand, with said inner teeth of the ring 251 and, on the other hand, with the teeth of a shaft fixed to the input gear 10.

As a variant, the pinion gears 254 can be carried by a part fixed to the locking ring 36, such as an intermediate flange.

A tappet 260 is mounted on the unlocking ring 36 and is intended to engage with the half-moon cross section to tilt the locking portion 31 and the shaft 30 from the locked position to the unlocked position.

The operation is the following.

Figure 11A:
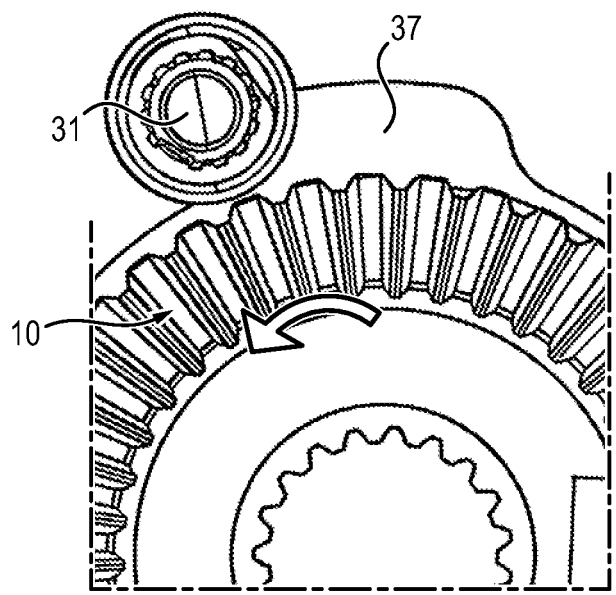
FIG. 11a, FIG. 11b, FIG. 11c and FIG. 11d illustrate different phases of unlocking the system of FIGS. 9 and 10.

Upon initiation of driving, the wolf tooth 37 of the locking ring 36 comes into abutment against the half-moon cross section of the portion 31 (FIG. 11a).

Figure 11B:
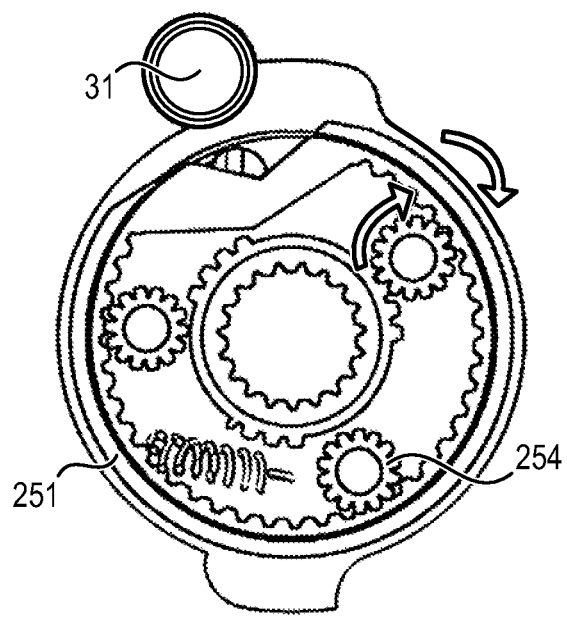
Figure 11C:
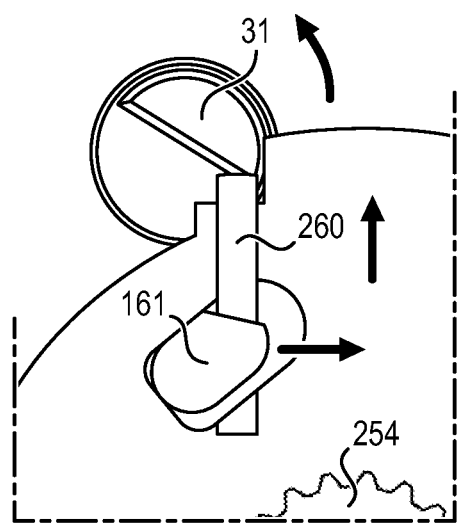

When the preload torque is attained, the input gear 10 rotates relative to the locking ring 36. This rotation causes the rotation of the pinion gears 254 and therefore the rotation of the internally-toothed ring 251. The rotary movement of the ring 261 displaces the tappet 260 (FIGS. 11b and 11c).

Figure 11D:
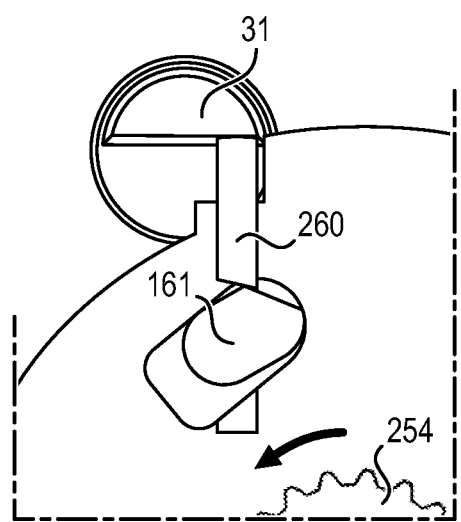

Its engagement against the portion 31 tilts the shaft 30 and frees the movement of the ring 36 and of the screw 4 of the actuator (FIG. 11d).

The invention claimed is:

1. A locking/unlocking system for an actuator for a thrust reverser, the actuator comprising a first element and a second element mounted movably in translation and in rotation relative to the first element, a rotation of the first element relative to the second element being configured to translate the second element relatively to the first element, the locking/unlocking system comprising:
   an input gear configured to drive the first element in rotation;
   a locking part rotationally fixed to the first element; and a locking member movable between a locked position in which the locking member prevents a rotation of the locking part and of the first element, and an unlocked position in which the locking member allows a rotation of the locking part and of the first element;

wherein the locking/unlocking system comprises a preloading arrangement, the preloading arrangement allowing a rotation of the input gear relative to the locking part when a torque between the input gear and the locking part is less than a preloading threshold of the preloading arrangement and allowing a driving in rotation of the locking part by the input gear, when the torque becomes greater than the preloading threshold, the preloading arrangement comprising displacing elements configured to allow that the rotation of the input gear displaces the locking member from the locked position to the unlocked position, the driving movement then being transmitted to the first element by the preloading arrangement in order to allow the deployment of the actuator.

2. The locking/unlocking system according to claim 1, wherein the elements include a cam carried by the locking member, the cam cooperating with a complementary element of the preloading arrangement, the complementary element being configured to tilt the cam and displace the locking member during a decoupling movement.

3. The locking/unlocking system according to claim 2, wherein the complementary element cooperating with the cam is a rotary roller mounted on a spindle parallel to the axis of rotation of the locking part, the spindle being rotationally fixed to the input gear.

4. The locking/unlocking system according to claim 3, wherein the preloading arrangement includes a flange rotationally fixed to the input gear, the rotary roller being mounted on the spindle which extends between the flange and the input gear.

5. The locking/unlocking system according to claim 4, wherein the preloading arrangement comprises several rotary rollers mounted between the flange and the input gear, while being distributed over the periphery of the input gear.

6. The locking/unlocking system according to claim 1,
wherein the preloading arrangement comprises a first flange rotationally fixed to the input gear, the first flange comprising a gearing, the locking/unlocking system further comprising an eccentric geared cam which comprises an eccentric gear, the eccentric geared cam being mounted on a spindle fixed to the locking part, and wherein the eccentric gear is configured to cooperate with the gearing of the first flange, the first flange and the eccentric geared cam being located in the same plane, a decoupling of the input gear and of the locking part being configured to cause a rotation of the eccentric geared cam, the eccentric geared cam cooperating with a surface of the locking member and the rotation of the eccentric geared cam displacing the locking member.

7. The locking/unlocking system according to claim 6, wherein the preloading arrangement comprises a second flange fixed to the locking part, the spindle of the eccentric geared cam is being mounted between the locking part and the second flange.

8. The locking/unlocking system according to claim 2, including a tappet configured to be moved by the decoupling movement.

9. The locking/unlocking system according to claim 8, wherein the locking part comprises a housing, the tappet being mounted in the housing, the tappet cooperating with an internally toothed gear, the internally toothed gear being driven in rotation by a pinion gear, the pinion gear meshing with an inner teeth of the internally toothed gear and with teeth rotationally fixed to the input gear, the spindles of the pinion gears being mounted on the locking part, the decoupling movement causing a decoupling of the gear and the locking part, a decoupling of the gear and the locking part causing the translation of the tappet which cooperates with a surface of the locking member, the translation of the tappet displacing the locking member.

10. An actuating device for a thrust reverser, the actuating device comprising:

an actuator comprising a first element, and a second element mounted movably in rotation and translation relative to the first element, so that a rotation of the first element relative to the second element causes a translation of the second element relative to the first element, and the locking/unlocking system according to claim 1.

* * * * *